Patented Oct. 8, 1940

2,217,622

UNITED STATES PATENT OFFICE 2,217,622

VULCANIZATION OF RUBBER

Joy G. Lichty, Stow, Ohio, assignor to Wingfoot Corporation, Wilmington, Del., a corporation of Delaware No Drawing. Application June 4, 1937, Serial No. 146,437

11 Claims. (Cl. 260—796)

This invention relates to the vulcanization of rubber. More particularly, it relates to the vulcanization of rubber in the presence of a material derived from a cyclohexanone and a primary aliphatic amine. The use of these new materials accelerates the vulcanization and yields rubber products of outstanding characteristics.

The compounds of the invention may be prepared, as indicated, by reacting a cyclohexanone with a primary aliphatic amine. It is believed that the reaction chiefly involves the elimination of water according to the following typical equation:

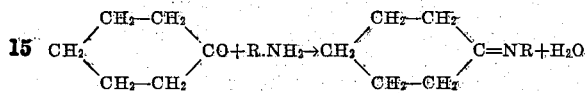

In addition to this reaction, it is well known that cyclohexanone reacts with itself to give such products as cyclohexylidene cyclohexanone having the formula:

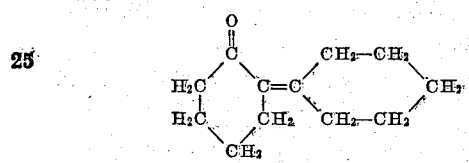

This compound may in turn react with the amine with the elimination of water in the same general type of reaction as that first shown above. Thus, the accelerators of the invention are in some instances mixtures of materials, although it is also possible to prepare the pure compounds by purification of the crude products or appropriate synthesis, and these pure products may likewise be employed as accelerators. In one instance where a fairly constant-boiling product was obtained, the analytical result for nitrogen was in close agreement with the cyclohexylidene amine. While in the above equation unsubstituted cyclohexanone is shown, it is also possible to employ cyclohexanones in which the ring contains substantially neutral or basic substituent groups, such as alkyl, aralkyl, aryl, alicyclic, alkoxy, aryloxy, amino, hydroxyl, etc.

The aliphatic amines which may be employed may be straight or branched chain, cyclic, saturated or unsaturated, or even aryl substituted. Thus there are included such representative compounds as methyl amine, ethyl amine, the propyl amines, the butyl amines, the amyl amines, allyl amine, cyclohexylamine, ortho methoxy cyclohexylamine, hexahydro o-toluidine, ethylene diamine, furfuryl amine, tetrahydro furfuryl amine, benzyl amine, etc.

The reaction usually proceeds readily as evidenced by the exothermic reactions at room temperature of the examples following. In some cases, however, it will be desirable to reflux the mixture to insure complete reaction.

The following specific examples will demonstrate the method of preparation of the compounds of the invention:

Example 1

To 49 grams of cyclohexanone were added 27.8 grams of 54% ethylene diamine in water. An exothermic reaction occurred. The mixture was allowed to stand for one hour and was then distilled by heating to 70° C. at 34 mm. pressure to remove water and other volatile ingredients. The residue of 43.8 grams of liquid material was taken as the reaction product.

Example 2

A mixture of 74 grams of cyclohexylamine and 74 grams of cyclohexanone was refluxed for 1½ hours. Solid sodium hydroxide was added to separate the water formed and the organic layer was then removed from the aqueous sodium hydroxide layer which formed. Distillation under reduced pressure gave 88.6 grams of material which boiled at 137–147° C. (chiefly at 144–147° C.) at 37 mm. pressure. This fraction contained 7.80% nitrogen as compared to 7.84% calculated for cyclohexylidene cyclohexylamine having the formula:

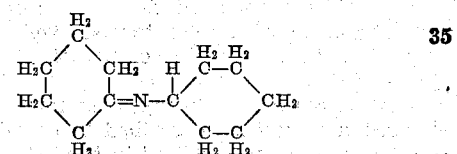

Example 3

49 grams of cyclohexanone were added to 43.5 grams of mixed monoamyl amines. An exothermic reaction occurred with water separating out. The mixture was refluxed for ¾ hour. The water was removed and the amine layer dried with anhydrous sodium sulfate. The amine layer was then heated to 165° C. to remove the more volatile products. The residue consisted of 72.5 grams of an amber liquid which was taken as the reaction product.

Example 4

A mixture of 84 grams of methyl cyclohexanone and 74.4 grams of cyclohexylamine was refluxed for one hour. The product was heated in the presence of solid sodium hydroxide to remove the water. The organic layer was separated and distilled under reduced pressure. The fraction boiling at 110–170° C. at 47 mm. pressure and weighing 77.4 grams was taken as the product.

These compounds and other materials coming within the scope of the invention may be employed in most or all of the usual rubber compounding formulae. The following is one formula in which they have been found to yield excellent results and which may be taken to demonstrate their characteristics.

| | Parts by weight |
|---|---|
| Pale crepe rubber | 100 |
| Zinc oxide | 5 |
| Sulfur | 3 |
| Accelerator | .5 |

Samples were compounded in accordance with this formula, cured and tested to give the following results:

| Cure in mins., °F. | Tensile, kgs./cm.$^2$ | Maximum elong., percent | Modulus kgs./cm.$^2$ | |
|---|---|---|---|---|
| | | | 500 percent | 700 percent |
| PRODUCT OF EXAMPLE 1 | | | | |
| 15/260 | 54 | 930 | 9 | 16 |
| 20 | 77 | 960 | 9 | 20 |
| 40 | 95 | 870 | 14 | 37 |
| 60 | 117 | 850 | 17 | 52 |
| 80 | 122 | 830 | 19 | 58 |
| PRODUCT OF EXAMPLE 2 | | | | |
| 20/260 | 68 | 950 | 8 | 20 |
| 40 | 87 | 850 | 13 | 36 |
| 60 | 96 | 830 | 15 | 42 |
| 80 | 94 | 810 | 16 | 46 |
| PRODUCT OF EXAMPLE 3 | | | | |
| 20/260 | 14 | 880 | 5 | 8 |
| 40 | 40 | 900 | 8 | 15 |
| 60 | 74 | 920 | 9 | 21 |
| 80 | 88 | 930 | 10 | 24 |
| PRODUCT OF EXAMPLE 4 | | | | |
| 20/260 | 8 | 830 | 3 | 4 |
| 40 | 32 | 940 | 5 | 9 |
| 60 | 64 | 950 | 7 | 16 |
| 80 | 76 | 870 | 9 | 29 |

It will be apparent from the foregoing data that the tested accelerators are very effective to produce good cures in comparatively short periods of time.

Although only the preferred forms of the invention have been described in detail, it will be apparent to those skilled in the art that various modifications may be made therein without departing from the spirit of the invention or the scope of the appended claims in which it is intended to cover all features of patentable novelty residing in the invention.

What I claim is:

1. The method of treating rubber which comprises vulcanizing the same in the presence of di-cyclohexylidene ethylene diamine.

2. The method of treating rubber which comprises vulcanizing the same in the presence of cyclohexylidene amyl amine.

3. The method of treating rubber which comprises vulcanizing the same in the presence of cyclohexylidene cyclohexylamine.

4. A rubber product which has been vulcanized in the presence of di-cyclohexylidene ethylene diamine.

5. A rubber product which has been vulcanized in the presence of cyclohexylidene amyl amine.

6. A rubber product which has been vulcanized in the presence of cyclohexylidene cyclohexylamine.

7. A method of treating rubber which comprises vulcanizing the same in the presence of a cyclohexylidene aliphatic amine in which the cyclohexylidene radical is saturated with substituents selected from the group consisting of hydrogen, alkyl, aralkyl, aryl, alicyclic, alkoxy, aryloxy, amino and hydroxyl radicals.

8. A method of treating rubber which comprises vulcanizing the same in the presence of a cyclohexylidene alicyclic amine in which the cyclohexylidene radical is saturated with substituents selected from the group consisting of hydrogen, alkyl, aralkyl, aryl, alicyclic, alkoxy, aryloxy, amino and hydroxyl radicals.

9. A rubber product which has been vulcanized in the presence of a cyclohexylidene aliphatic amine in which the cyclohexylidene radical is saturated with substituents selected from the group consisting of hydrogen, alkyl, aralkyl, aryl, alicyclic, alkoxy, aryloxy, amino and hydroxyl radicals.

10. A rubber product which has been vulcanized in the presence of a cyclohexylidene alkyl amine in which the cyclohexylidene radical is saturated with substituents selected from the group consisting of hydrogen, alkyl, aralkyl, aryl, alicyclic, alkoxy, aryloxy, amino and hydroxyl radicals.

11. A rubber product which has been vulcanized in the presence of a cyclohexylidene alicyclic amine in which the cyclohexylidene radical is saturated with substituents selected from the group consisting of hydrogen, alkyl, aralkyl, aryl, alicyclic, alkoxy, aryloxy, amino and hydroxyl radicals.

JOY G. LICHTY.